(12) United States Patent
Lee et al.

(10) Patent No.: US 7,866,625 B2
(45) Date of Patent: Jan. 11, 2011

(54) SOLENOID VALVE FOR BRAKE SYSTEM

(75) Inventors: Chung Jae Lee, Gyeonggi-do (KR);
Wook Jin Choi, Gyeonggi-do (KR);
Yong Kap Kim, Gyeonggi-do (KR)

(73) Assignee: Mando Corporation, Gyeonggi-Do (KR)

( * ) Notice: Subject to any disclaimer, the term of this patent is extended or adjusted under 35 U.S.C. 154(b) by 330 days.

(21) Appl. No.: 12/110,713

(22) Filed: Apr. 28, 2008

(65) Prior Publication Data

US 2009/0095928 A1    Apr. 16, 2009

(30) Foreign Application Priority Data

Oct. 11, 2007    (KR) .................. 10-2007-102362
Nov. 15, 2007   (KR) .................. 10-2007-116369

(51) Int. Cl.
*F16K 31/12* (2006.01)

(52) U.S. Cl. ............. 251/30.04; 251/30.03; 251/129.15

(58) Field of Classification Search ............ 251/301.01, 251/30.02, 30.03, 30.04, 129.15
See application file for complete search history.

(56) References Cited

U.S. PATENT DOCUMENTS

| | | | | |
|---|---|---|---|---|
| 5,361,802 A | * | 11/1994 | Kroll et al. ................... | 137/552 |
| 5,810,330 A | * | 9/1998 | Eith et al. .............. | 251/129.19 |
| 6,254,200 B1 | * | 7/2001 | Ganzel ..................... | 303/119.2 |
| 6,435,210 B1 | * | 8/2002 | Obersteiner et al. .... | 137/599.18 |
| 6,481,452 B2 | * | 11/2002 | Reuter et al. ................... | 137/14 |
| 6,796,619 B1 | * | 9/2004 | Hinz et al. ............... | 303/119.2 |
| 6,827,332 B2 | * | 12/2004 | Hanneke et al. ........ | 251/129.15 |
| 7,198,249 B2 | * | 4/2007 | Nakayasu ................ | 251/30.04 |

FOREIGN PATENT DOCUMENTS

| | | |
|---|---|---|
| DE | 102 52 231 A1 | 6/1998 |
| DE | 197 51 333 A1 | 11/2003 |
| DE | 10 2004 022 820 A1 | 4/2005 |
| DE | 203 21 276 U1 | 10/2006 |
| KR | 10-0541244 | 12/2005 |

\* cited by examiner

*Primary Examiner*—John K Fristoe, Jr.
(74) *Attorney, Agent, or Firm*—McDermott Will & Emery LLP

(57) ABSTRACT

A solenoid valve for a brake system, which has a simplified configuration and can be easily manufactured with reduced manufacturing costs. The solenoid valve includes valve seat member integrally formed with a seat portion having a first orifice, an opening/closing member slidably installed in the valve seat member, the opening/closing member having an inner passage formed through the opening/closing member, an outer passage formed at an outer surface of the opening/closing member, a second orifice formed at one end of the opening/closing member, the second orifice having a smaller diameter than that of the first orifice, and a first opening/closing portion formed at the other end of the opening/closing member to open or close the first orifice, an opening spring to move the opening/closing member, for opening of the first orifice, a sleeve having a first end coupled to an outer surface of the valve seat member and a flange formed at the first end so as to be fixed to a modulator block, a valve core coupled to a second end of the sleeve, opposite to the first end of the sleeve, an armature slidably mounted in the sleeve, the armature having a second opening/closing portion to open or close the second orifice, and a restoring spring to press the armature toward the second orifice.

4 Claims, 7 Drawing Sheets

SOLENOID VALVE FOR BRAKE SYSTEM

BACKGROUND OF THE INVENTION

1. Field of the Invention

The present invention relates to a solenoid valve for a brake system, and more particularly, to a solenoid valve for a brake system capable of being more easily manufactured and reducing manufacturing costs.

2. Description of the Related Art

Generally, an anti-lock brake system for vehicles serves to prevent locking of wheels by sensing slippage of the wheels and suitably controlling braking pressure applied to the wheels. The anti-lock brake system prevents the wheels of the vehicle from skidding during braking, whereby the steering performance of the vehicle is maintained, and the vehicle is stopped safely.

In order to control braking pressure, the brake system includes a plurality of solenoid valves to open or close an oil path of a braking hydraulic pressure line. The solenoid valves include normal open type solenoid valves which are normally kept in an opened state, and normal close type solenoid valves which are normally kept in a closed state.

FIG. 1 shows a conventional normal close type solenoid valve. A conventional normal close type solenoid valve includes a valve housing 3 press-fitted in a bore 2 of a modulator block 1, a cylindrical sleeve 4 coupled to the valve housing 3, a valve core 5 coupled to the sleeve 4 at an opposite side of the valve housing 3, and an armature 6 slidably mounted in the sleeve 4. The solenoid valve further includes a valve seat 7 press-fitted in the valve housing 3, the valve seat 7 having a first orifice 7a, and an opening/closing member 8 slidably mounted in the valve housing 3, the opening/closing member 8 being formed at an upper portion thereof with a second orifice 8a that is smaller than the first orifice 7a and also, being formed at a lower portion thereof with an opening/closing portion 8b to open or close the first orifice 7a.

When the armature 6 is moved toward the valve core 5 by a magnetic force, the smaller second orifice 8a is opened first. Then, the larger first orifice 7a can be opened as an opening spring 9 pushes the opening/closing member 8 up under a reduced pressure difference between upstream and downstream of the second orifice 8a. This results in easy opening of an oil path even with a low force.

As described above, the conventional solenoid valve is constituted such that the valve housing and the valve seat are separately provided, and the valve seat is press-fitted in the valve housing. However, the conventional solenoid valve as constituted above has problems of a great number of components, complicated structure, and difficult manufacture. Accordingly, manufacturing costs of the valve are high.

Further, because the sleeve and the valve core are coupled to each other through a welding process, and also the sleeve and the valve housing are coupled to each other through a welding process, the above-described conventional solenoid valve has shortcomings of high work effort and low assembly productivity.

SUMMARY OF THE INVENTION

Therefore, it is an aspect of the invention to provide a solenoid valve for a brake system, which has a simple constitution and can be easily manufactured with reduced manufacturing costs.

Additional aspects and/or advantages of the invention will be set forth in part in the description which follows and, in part, will be obvious from the description, or may be learned by practice of the invention.

In accordance with an aspect of the invention, there is provided a solenoid valve for a brake system, comprising: a valve seat member integrally formed with a seat portion having a first orifice; an opening/closing member slidably installed in the valve seat member, the opening/closing member having an inner passage formed through the opening/closing member, an outer passage formed at an outer surface of the opening/closing member, a second orifice formed at one end of the opening/closing member, the second orifice having a smaller diameter than that of the first orifice, and a first opening/closing portion formed at the other end of the opening/closing member to open or close the first orifice; an opening spring to move the opening/closing member, for opening of the first orifice; a sleeve having a first end coupled to an outer surface of the valve seat member and a flange formed at the first end so as to be fixed to a modulator block; a valve core coupled to a second end of the sleeve, opposite to the first end of the sleeve; an armature slidably mounted in the sleeve, the armature having a second opening/closing portion to open or close the second orifice; and a restoring spring to press the armature toward the second orifice.

The solenoid valve may further comprise: a spring supporting member fixed in the valve seat member, to support the opening spring.

The valve seat member may include a stepped portion formed at an outer surface thereof, to allow the flange of the sleeve to be caught by the stepped portion.

The valve core may include a coupling recess formed at an outer surface thereof, for coupling of the sleeve, and the sleeve may include a latching portion to be fitted into the coupling recess and latched by the coupling recess by deformation of the sleeve.

The valve seat member may include a coupling recess formed at an outer surface thereof, for coupling of the sleeve, and the sleeve may include a latching portion to be fitted into the coupling recess and latched by the coupling recess by deformation of the sleeve.

BRIEF DESCRIPTION OF THE DRAWINGS

These and/or other aspects and advantages of the exemplary embodiments of the invention will become apparent and more readily appreciated from the following description of the embodiments, taken in conjunction with the accompanying drawings, of which.

DETAILED DESCRIPTION OF THE PREFERRED EMBODIMENTS

Figure 1:
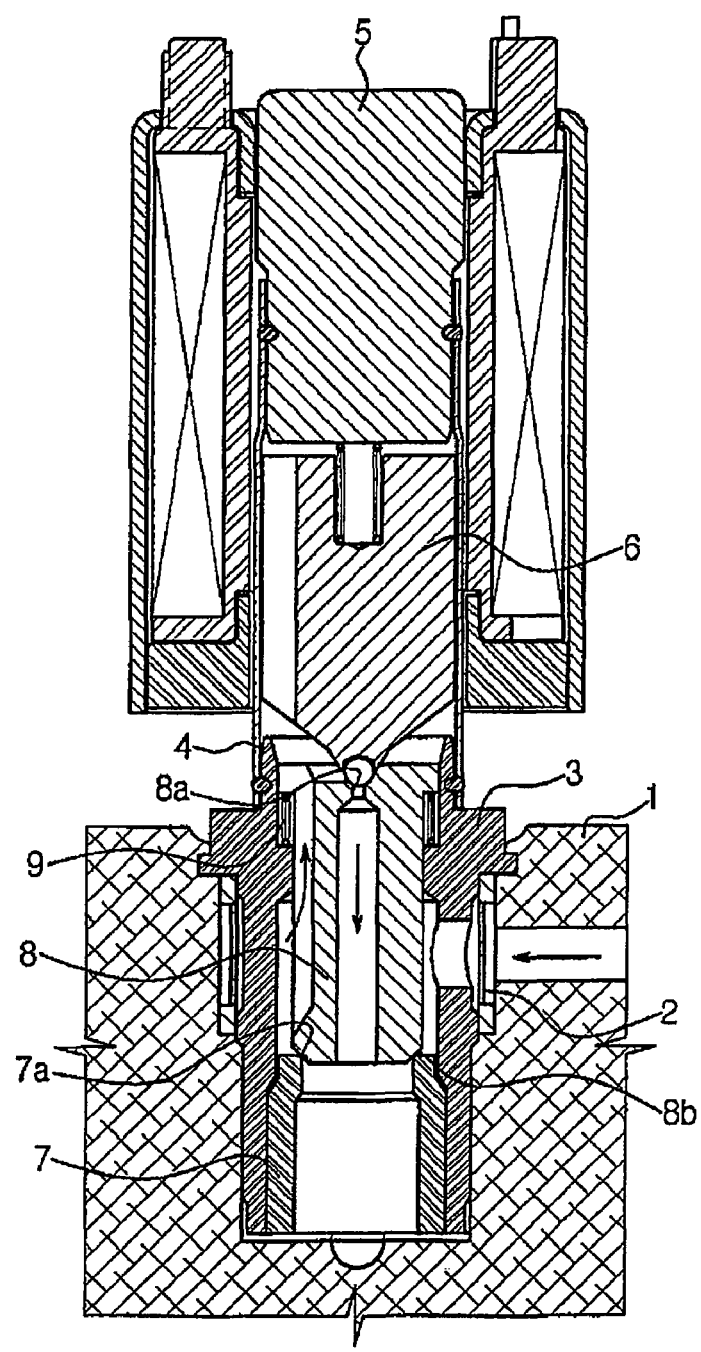
FIG. 1 is a sectional view of a conventional solenoid valve for a brake system.

Reference will now be made in detail to exemplary embodiments of the present invention, examples of which are illustrated in the accompanying drawings, wherein like reference numerals refer to like elements throughout. The embodiments are described below to explain the present invention by referring to the figures.

Figure 2:
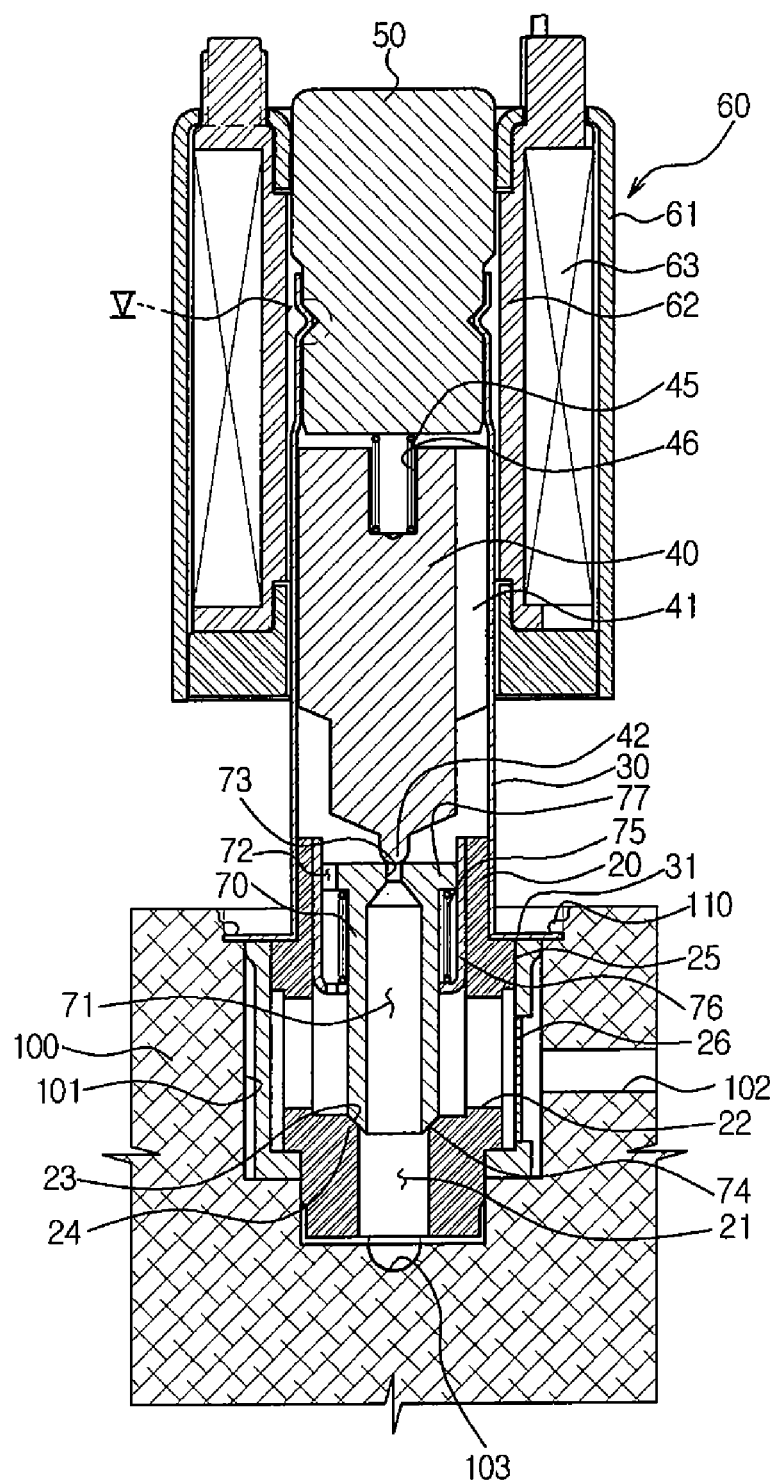
FIG. 2 is a sectional view of a solenoid valve for a brake system according to an embodiment of the present invention, illustrating the closed state of first and second orifices.

A solenoid valve for a brake system according to the present invention, as shown in FIG. 2, comprises a valve seat member 20, an opening/closing member 70, a sleeve 30, an armature 40, a valve core 50 and an exciting coil assembly 60.

The valve seat member 20 has a first passage 21 formed therethrough in a vertical longitudinal direction thereof, and a second passage 22 formed in a radial direction thereof to communicate with the first flow-path 21. The second passage 22 communicates with an inlet passage 102 of a modulator block 100, and the first passage 21 communicates with an outlet passage 103 of the modulator block 100. The valve seat member 20 is integrally formed, below the first passage 21, with a seat portion 24 having a first orifice 23 to open or close the first passage 21.

The opening/closing member 70 has a cylindrical form and is slidably installed in the first passage 21 of the valve seat member 20. The opening/closing member 70 has an inner passage 71 formed vertically therethrough, and an outer passage 72 at an outer surface thereof. The opening/closing member 70 is formed, at an upper end thereof, with a second orifice 73, which has a smaller diameter than that of the first orifice 23. The opening/closing member 70 is also formed, at a lower end thereof, with a first opening/closing portion 74 to open or close the first orifice 23.

An opening spring 75 is installed around the outer surface of the opening/closing member 70 and serves to move the opening/closing member 70 in an opening direction of the first orifice 23. A lower end of the opening spring 75 is supported by a spring supporting member 76 press-fitted to an inner surface of the valve seat member 20, and an upper end of the opening spring 75 is supported by a flange 77 formed around an upper portion of the outer surface of the opening/closing member 70. The opening/closing member 70 moves in a direction of opening the first orifice 23 so long as it is not pressed by the armature 40, so as to open the first orifice 23.

The valve seat member 20 is formed at an outer surface thereof with a stepped portion 25, which protrudes outward so as to be coupled with the sleeve 30. Also, a cylindrical filter member 26 is installed around the valve seat member 20. The filter member 26 serves to filter impurities contained in oil that is being introduced from the inlet passage 102 of the modulator block 100 into the second passage 22 of the valve seat member 20. The filter member 26 is mounted at the outer surface of the valve seat member 20 such that it is inserted into a bore 101 of the modulator block 100, together with the valve seat member 20.

The sleeve 30 is formed in a cylindrical shape, and has an inner diameter corresponding to an outer diameter of an upper portion of the valve seat member 20. A lower end (i.e. first end) of the sleeve 30 is press-fitted on the outer surface of the valve seat member 20. The first end of the sleeve 30 is provided with a flange 31. The flange 31 is fixed by deformation of the modulator block 100 when the solenoid valve is mounted to the modulator block 100. The stepped portion 25 of the valve seat member 20 serves to determine a coupling position of the flange 31 when the flange 31 is coupled to the valve seat member 20, as well as to support the flange 31, to thereby securely couple the flange 31 to the valve seat member 20.

Figure 5:
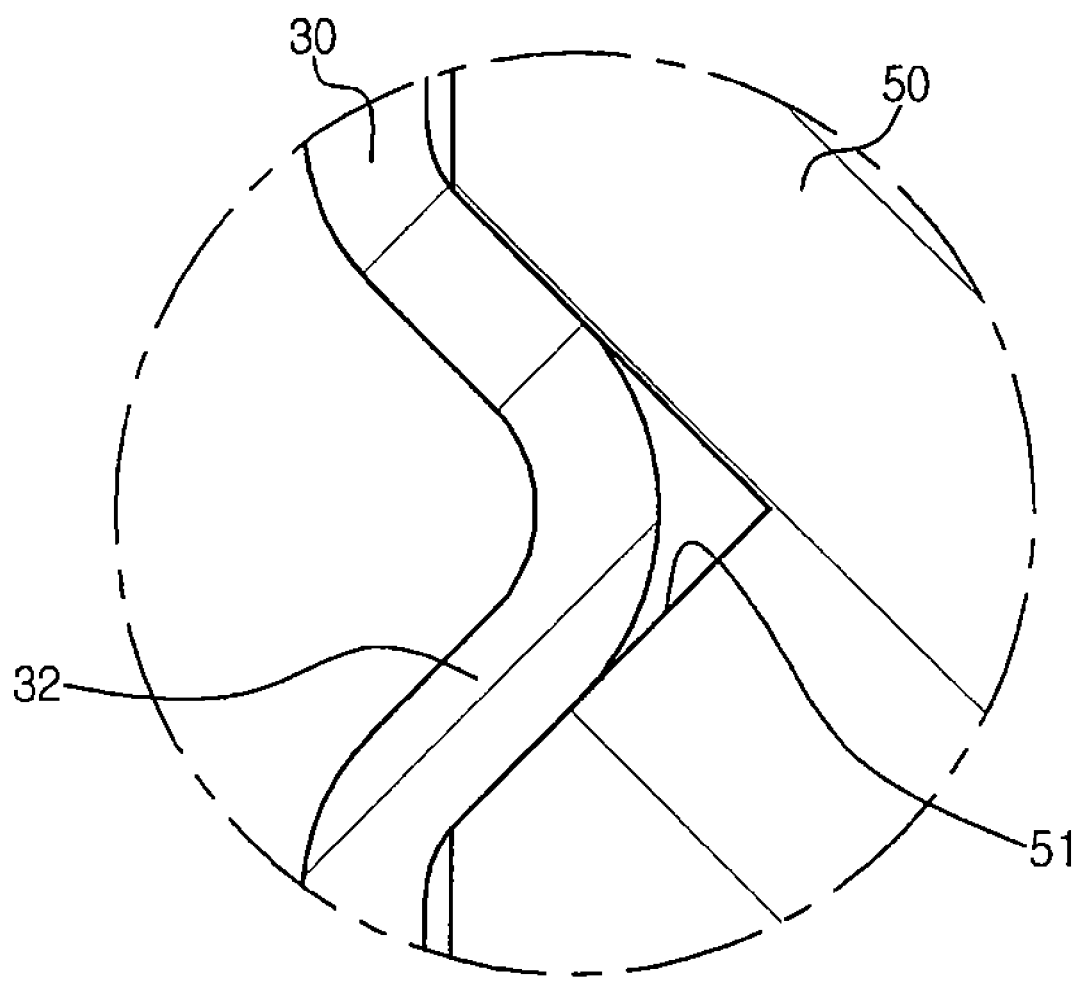
FIG. 5 is a detailed view of a V portion in FIG. 2.

The valve core 50 is press-fitted in an upper end (i.e. second end) of the sleeve 30, and shields the opened upper end of the sleeve 30. In order to couple the valve core 50 to the sleeve 30, as shown in FIG. 5, the valve core 50 is formed with a coupling recess 51 along an outer peripheral surface thereof, and the sleeve 30 is provided with a latching portion 32 which is formed by deformation of the sleeve 30 so as to be fitted into the coupling recess 51 and latched by the coupling recess 51.

In other words, the valve core 50 can be fixed to the sleeve 30 in such a manner that the valve core 50 is first inserted into the sleeve 30 and then the latching portion 32 is formed by deformation of the sleeve 30. As compared to a conventional welding process, the above-described coupling structure can facilitate the coupling of the sleeve 30 and the valve core 50, and can simplify the coupling process.

The armature 40 is vertically slidably mounted in the sleeve 30. The armature 40 is formed in a cylindrical shape, and has an outer diameter corresponding to the inner diameter of the sleeve 30. The armature 40 is formed, at an outer surface thereof, with an oil passage 41 for vertical movement of oil. In addition, the armature 40 is provided with a semi-spherical second opening/closing portion 42 at a lower end thereof, so as to open or close the second orifice 73. Accordingly, the armature 40 can open or close the second orifice 73 via sliding motion thereof.

A restoring spring 45 is mounted between the armature 40 and the valve core 50, to press the armature 40 toward the opening/closing member 70 in a normal state. The restoring spring 45 is received in a spring receiving recess 46 formed in an upper portion of the armature 40. This serves to cause the armature 40 to close the second orifice 73 in a normal state by the restoring spring 45 pressing the armature 40 toward the opening/closing member 70. The restoring spring 45 provides a greater elastic force than that of the opening spring 75 such that the restoring spring 45 can press the armature 40 and the opening/closing member 70 by overcoming the elastic force of the opening spring 75.

The exciting coil assembly 60 is provided in a cylindrical shape, and is coupled to an outer upper of the valve core 50 and the outer surface of the upper portion of the sleeve 30. The exciting coil assembly 60 includes a cylindrical coil case 61, a bobbin 62 accommodated in the coil case 61, and an exciting coil 63 wound on an outer surface of the bobbin 62. When electric power is applied to the exciting coil 63, a magnetic field is generated, so that the armature 40 is moved toward the valve core 50, thereby opening the second orifice 73.

When intending to mount the solenoid valve to the modulator block 100, first, the valve seat member 20, filter member 26, opening/closing member 70, sleeve 30, armature 40, restoring spring 45, valve core 50, etc. are all assembled at the outside of the modulator block 100. Thereafter, the filter member 26 and the valve seat member 20 are introduced into the bore 101 of the modulator block 100. In such a state, an entrance of the bore 101 of the modulator block 100 is deformed. By doing so, a portion 110 of the modulator block 100 is deformed to cover the flange 31 of the sleeve 30, so as to fix the sleeve 30. Through the above processes, the installation of the valve is completed.

Since the seat portion 24 forming the first orifice 23 is integrally formed with the valve seat member 20 and the sleeve 30 is coupled to the valve seat member 20, the above-described solenoid valve for a brake system has advantages of a reduced number of parts and simplified configuration. That is, the above-described solenoid valve has a configuration simpler than a prior art in which a valve housing and a valve seat are separately provided. Also, since the flange 31 of the sleeve 30 is directly fixed to the modulator block 100 once the sleeve 30 is coupled to the outer surface of the valve seat member 20, the solenoid valve of the first embodiment can be easily assembled. Further, because an additional welding process is not required to couple the valve seat member 20 and the sleeve 30, the manufacturing processes can be simplified. Still further, the valve core 50 and the sleeve 30 can be easily coupled to each other by means of the coupling recess 51 and the latching portion 32 formed by deformation of the sleeve 30. Accordingly, the solenoid valve of this embodiment has a simplified configuration, and can be easily manufactured. As a result, manufacturing costs can be reduced.

Figure 6:
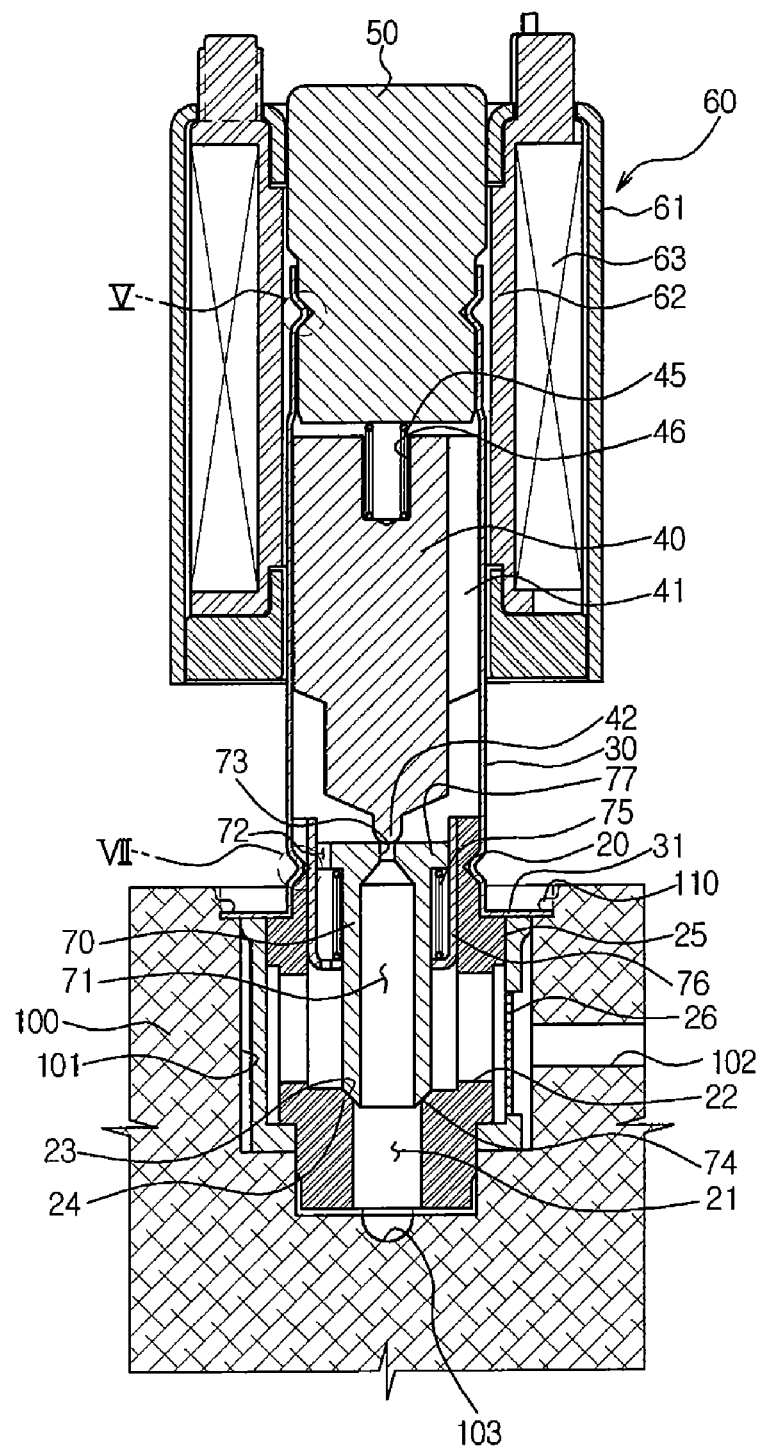
FIG. 6 is a sectional view of a solenoid valve for a brake system according to another embodiment of the present invention.
Figure 7:
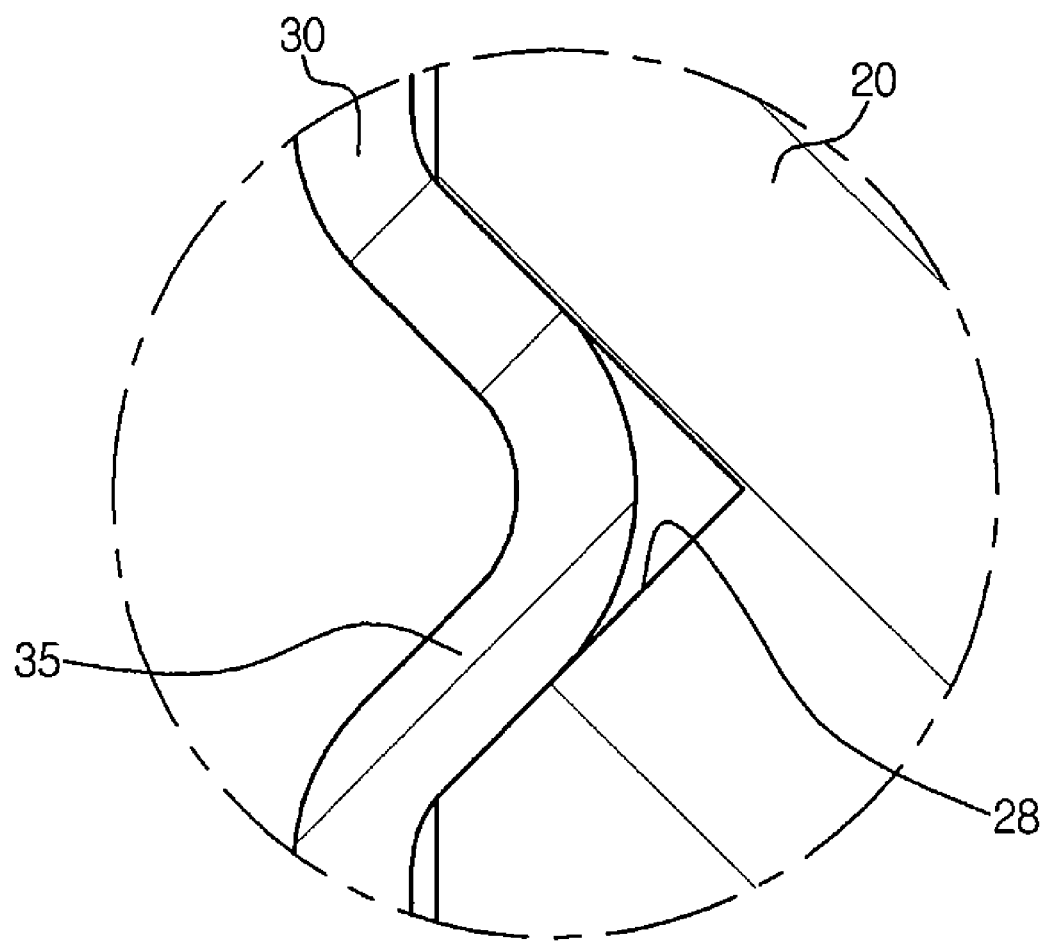
FIG. 7 is a detailed view of a VII portion in FIG. 6.

FIGS. 6 and 7 illustrate another embodiment of the solenoid valve for a brake system according to the present invention. In the present embodiment shown in FIG. 6, in order to couple an outer surface of an upper portion of the valve seat member 20 to the sleeve 30, there are provided a coupling recess 28 and a latching portion 35. Specifically, as shown in FIG. 7, the valve seat member 20 is formed with the coupling recess 28 along the outer peripheral surface thereof, and the sleeve 30 is provided, at a lower portion thereof, with a latching portion 35 which is formed by deformation of the sleeve 30 so as to be fitted into the coupling recess 28 and latched by the coupling recess 28. In other words, the valve seat member 20 can be fixed to the sleeve 30 in such a manner that the upper portion of the valve seat member 20 is first inserted into the sleeve 30 and then the latching portion 35 is formed by deformation of the sleeve 30. This coupling structure can achieve the strong coupling of the sleeve 30 and the valve seat member 20 without a welding process.

The opening/closing operation of the solenoid valve according to the present invention will now be explained.

As shown in FIG. 2, when electric power is not applied to the exciting coil assembly 60, the restoring spring 45 pushes the armature 40 toward the second orifice 73, causing the second opening/closing portion 42 of the armature 40 to close the second orifice 73. Also, the armature 40 presses the opening/closing member 70 by a pressure force of the restoring spring 45, causing the opening/closing member 70 to close the first orifice 23. Accordingly, oil cannot flow from the inlet passage 102 to the outlet passage 103 of the modulator block 100.

Figure 3:
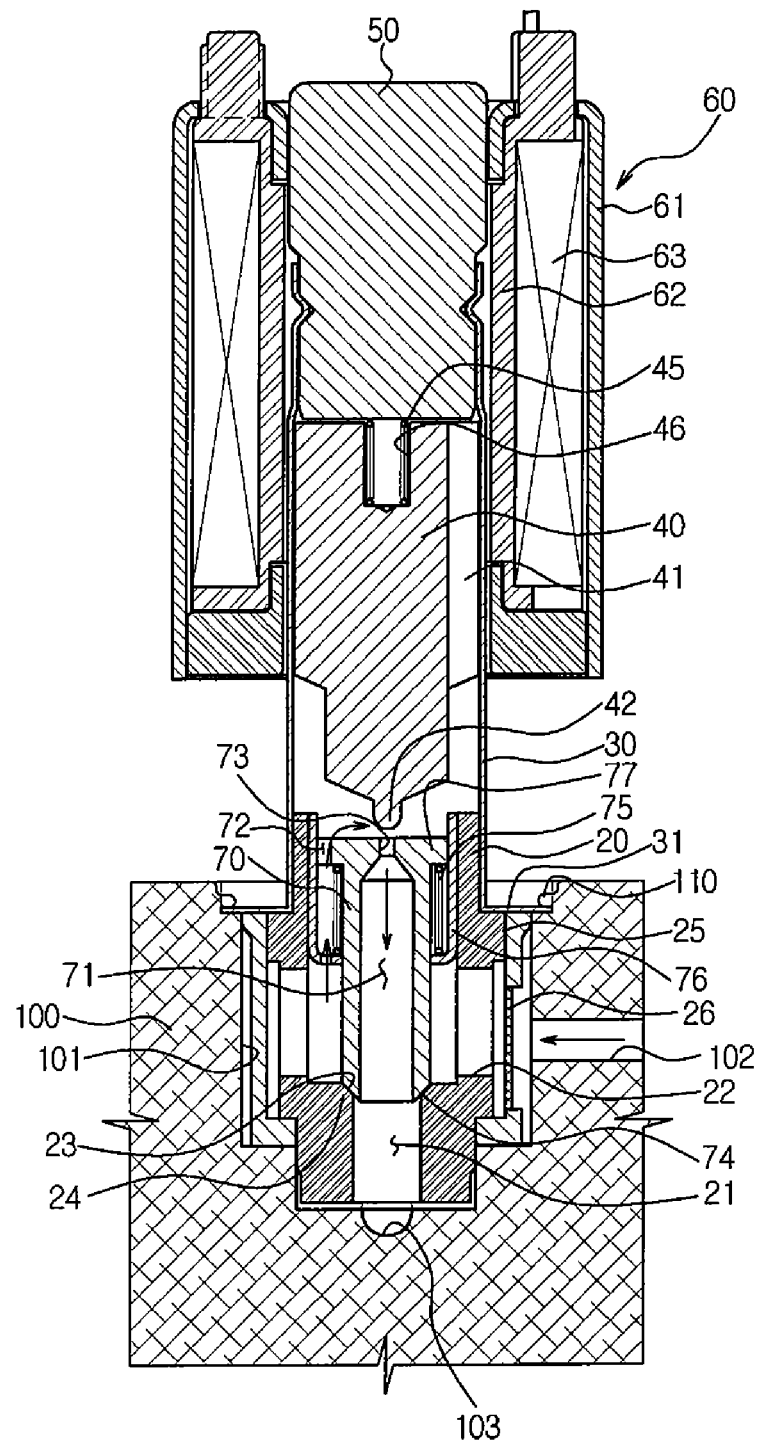
FIG. 3 is a sectional view of the solenoid valve, illustrating the opened state of the first orifice.

As shown in FIG. 3, when electric power is applied to the exciting coil assembly 60, the armature 40 is moved toward the valve core 50 against an elastic force of the restoring spring 45 by a magnetic force exerted between the armature 40 and the valve core 50. Accordingly, the second orifice 73 is opened. If the second orifice 73 is opened, the oil in the inlet passage 102 passes through the filter member 26, and flows into the sleeve 30 through the outer passage 72 of the opening/closing member 70. Subsequently, the oil flows to the outlet passage 103 via the second orifice 73.

Figure 4:
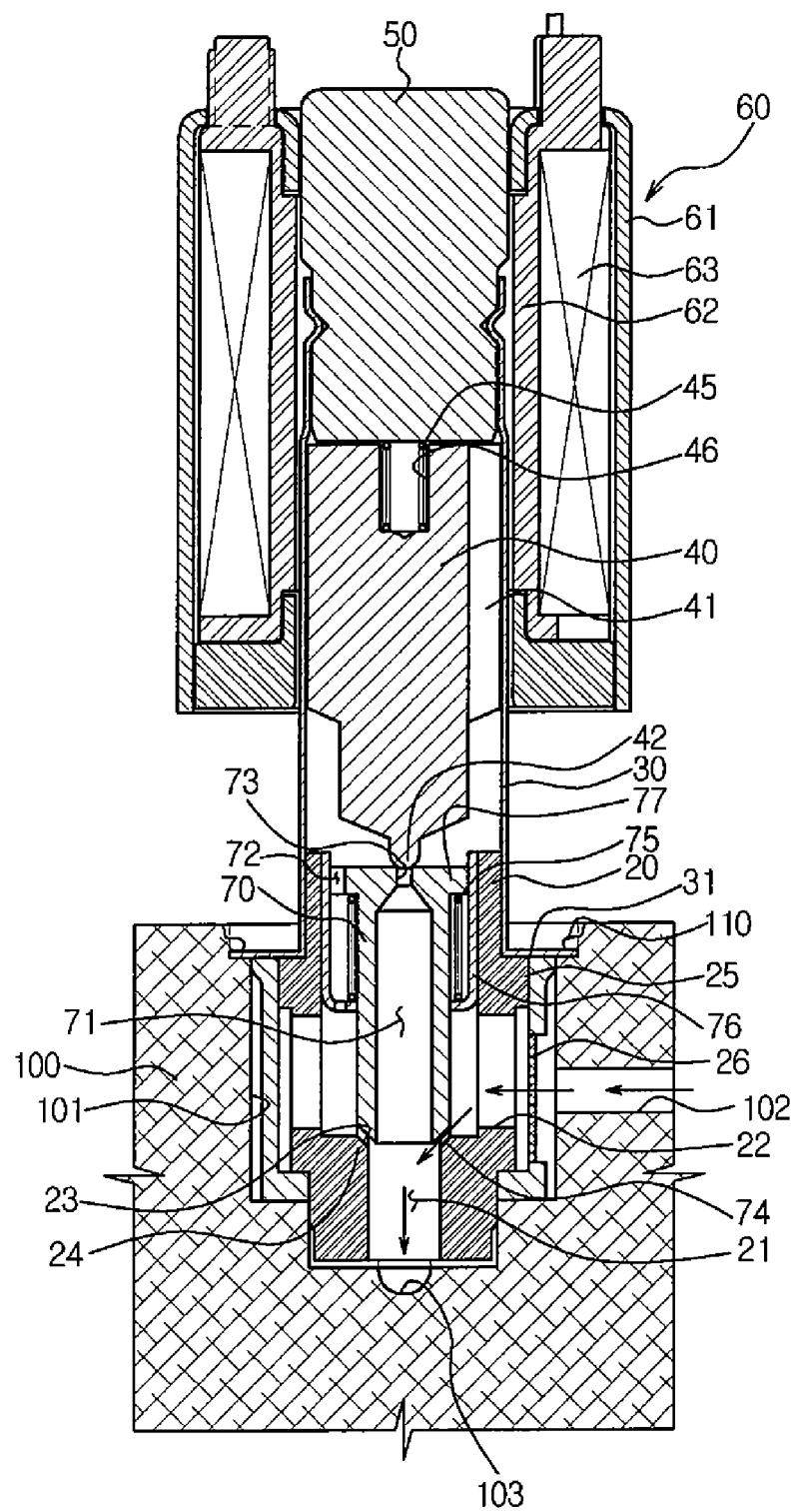
FIG. 4 is a sectional view of the solenoid valve for a brake system according to the present invention, illustrating the opened state of the second orifice.

If a pressure difference between upstream and downstream of the second orifice 73 is reduced after the second orifice 73 is opened first, a pressure difference between the oil in the sleeve 30 and the oil in the opening/closing member 70 is also reduced. With the reduced pressure difference, as shown in FIG. 4, the opening/closing member 70 can be lifted by an elastic force of the opening spring 75, thereby opening the first orifice 23 that has a relatively large diameter. Accordingly, the oil can be moved toward the outlet passage 103 by passing through the large-diameter first orifice 23, rather than passing through the second orifice 73. With a successive two-step opening of an oil path in such a manner that the small-diameter second orifice 73 is opened first and thereafter, the large-diameter second orifice 23 is opened, the solenoid valve of the present invention can be easily opened even with a low force.

As apparent from the above description, the present invention provides a solenoid valve, in which a valve seat member is integrally formed with a seat portion forming a first orifice and a sleeve is coupled to the valve seat member, resulting in a reduced number of parts and consequently, simplified configuration.

Further, since a flange of the sleeve is directly fixed to a modulator block, the solenoid valve according to the present invention can be easily assembled, and the valve seat member and the sleeve can be easily coupled to each other without a separate welding process, etc. Furthermore, a valve core can also be easily coupled to the sleeve as a latching portion formed by deformation of the sleeve is coupled into a coupling recess of the valve core. As a result, the solenoid valve according to the present invention can be easily manufactured with reduced manufacturing costs.

Although embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A solenoid valve for a brake system, comprising:
   a valve seat member integrally formed with a seat portion having a first orifice;
   an opening/closing member slidably installed in the valve seat member, the opening/closing member having an inner passage formed through the opening/closing member, an outer passage formed at an outer surface of the opening/closing member, a second orifice formed at one end of the opening/closing member, the second orifice having a smaller diameter than that of the first orifice, and a first opening/closing portion formed at the other end of the opening/closing member to open or close the first orifice;
   an opening spring to move the opening/closing member, for opening of the first orifice;
   a sleeve having a first end coupled to an outer surface of the valve seat member and a flange formed at the first end so as to be fixed to a modulator block;
   a valve core coupled to a second end of the sleeve, opposite to the first end of the sleeve;
   an armature slidably mounted in the sleeve, the armature having a second opening/closing portion to open or close the second orifice; and
   a restoring spring to press the armature toward the second orifice,
   wherein a portion of the modulator block is deformed to cover the flange of the sleeve, so as to fix the sleeve,
   wherein the valve seat member includes a first coupling recess formed at an outer surface thereof, for coupling of the sleeve, and
   the sleeve includes a first latching portion to be fitted into the first coupling recess and latched by the first coupling recess by deformation of the sleeve.

2. The solenoid valve according to claim 1, further comprising:
   a spring supporting member fixed in the valve seat member, to support the opening spring.

3. The solenoid valve according to claim 1, wherein the valve seat member includes a stepped portion formed at an outer surface thereof, to allow the flange of the sleeve to be caught by the stepped portion.

4. The solenoid valve according to claim 1, wherein the valve core includes a second coupling recess formed at an outer surface thereof, for coupling of the sleeve, and
   the sleeve includes a second latching portion to be fitted into the second coupling recess and latched by the second coupling recess by deformation of the sleeve.

* * * * *